US007583646B2

United States Patent
Hua et al.

(10) Patent No.: US 7,583,646 B2
(45) Date of Patent: Sep. 1, 2009

(54) METHOD AND APPARATUS FOR FACILITATING INTERACTION BETWEEN A HOME SUBSCRIBER SERVER (HSS) AND A HOME LOCATION REGISTER (HLR) IN A LEGACY NETWORK

(75) Inventors: Shiyan Hua, Lisle, IL (US); Ahmed N. Zaki, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 233 days.

(21) Appl. No.: 10/965,387

(22) Filed: Oct. 14, 2004

(65) Prior Publication Data

US 2006/0084431 A1    Apr. 20, 2006

(51) Int. Cl.
*H04W 4/00* (2009.01)
(52) U.S. Cl. ................................ 370/338; 455/433
(58) Field of Classification Search ............. 370/338; 455/433, 456.1
See application file for complete search history.

(56) References Cited

U.S. PATENT DOCUMENTS 5,854,982 A    12/1998  Chambers et al.
2001/0043577 A1*  11/2001  Barany et al. ............... 370/328
2004/0229601 A1*  11/2004  Zabawskyj et al. .......... 455/417
2005/0278447 A1*  12/2005  Raether et al. .............. 709/227

FOREIGN PATENT DOCUMENTS

EP    1 366 590 A0    12/2002

OTHER PUBLICATIONS

Verkama et al, Mobility Management n the Third Generation Mobile Network, 1996, IEEE Global Telecommunication Conference, 2058-2062.*
Nortel Networks: "Access Independence using Two-Tier Mobility," 3GPP SA2 TDOC S20000759, May 9, 2000, pp. 1-9, XP0023257885, Stockholm, Sweden.
European Search Report.

* cited by examiner

*Primary Examiner*—Quochien B Vuong

(57) ABSTRACT

A technique and system are provided to allow home subscriber servers (HSSs) to retrieve a subscriber's dynamic location/state information from a legacy home location register (HLR). For example, a mobile application part (MAP) operation ATI (AnyTimeInterrogation) messaging technique may be used by the home subscriber server (HSS) to query the legacy home location register (HLR) and obtain the requested location/state information.

26 Claims, 3 Drawing Sheets

METHOD AND APPARATUS FOR FACILITATING INTERACTION BETWEEN A HOME SUBSCRIBER SERVER (HSS) AND A HOME LOCATION REGISTER (HLR) IN A LEGACY NETWORK

BACKGROUND OF THE INVENTION

This invention relates to a method and apparatus for facilitating interaction between a home subscriber server (HSS) and a home location register (HLR) in a legacy network. More particularly, the invention provides a technique and system to allow home subscriber servers (HSSs) to retrieve a subscriber's dynamic location/state information from a legacy home location register (HLR). For example, a mobile application part (MAP) operation ATI (AnyTimeInterrogation) messaging technique may be used by the home subscriber server (HSS) to query the legacy home location register (HLR) and obtain the requested location/state information.

While the invention is particularly directed to the art of facilitating interaction between a home subscriber server (HSS) and a home location register (HLR) in a legacy network to retrieve state or location information, and will be thus described with specific reference thereto, it will be appreciated that the invention may have usefulness in other fields and applications. For example, the invention may be used in other implementations of new network elements in a legacy network.

By way of background, legacy networks include functionality that is useful for determining location and/or state information for particular mobile subscribers. For example, with reference to FIG. 1, a portion of a network 10 is shown. As illustrated, the network includes a service control point (SCP) 12 that communicates with a home location register (HLR) 14. Also shown is a visitor location register (VLR) and/or a serving GPRS (General Radio Packet Service) support node (SGSN) 16.

When a request for a location or state of a mobile station is, received by the service control point (SCP) 12, it typically sends a request for that information to an appropriate home location register (HLR) 14 in the form of a mobile application part (MAP) message (e.g. an AnyTimeInterrogation (ATI) request). The home location register then communicates with the visitor location register (VLR) and/or a serving GPRS (General Radio Packet Service) support node (SGSN) 16 to retrieve the requested information using standard messaging techniques (e.g. mobile application part (MAP) ProvideSubscriberInfo (PSI) requests and responses). The home location register (HLR) 14 ultimately sends the requested information back to the service control point (SCP) 12 using mobile application part (MAP) messaging (e.g. an AnyTimeInterrogation (ATI) response).

The 3GPP standard (e.g. 3GPP Sh standard TS23.002) specifies the implementation of home subscriber servers (HSSs) to replace the legacy home location registers (HLRs). To do so, the standard mandates that the functionality of the home subscriber servers (HSSs) include the legacy home location register (HLR) functions. The home subscriber servers (HSSs) are also required to provide Internet (or IP) media subsystem (IMS) functions. This is illustrated in FIG. 2, where a home subscriber server (HSS) 10 includes a first module 22 for implementing internet multimedia subsystem (IMS) functions and a second module 24 for implementing home location register (HLR) functions.

In this environment, a home subscriber server (HSS) receives a location/state query from an application server (AS). Then, the home subscriber server (HSS) sends a mobile application part (MAP) ProvideSubscriberInfo (PSI) request, based on information available to the home subscriber server (HSS), directly to the subscriber's visitor location register and/or serving GPRS support node (VLR/SGSN) to get the location/state information.

In implementation, however, many service providers wish to maintain legacy home location registers (HLRs) and purchase home subscriber servers (HSSs) that do not function as home location registers (HLRs). The home subscriber servers (HSSs) of this type still perform Internet multimedia subsystem (IMS) functions. But, the home subscriber server (HSS) in this form does not maintain or have available to it the subscriber's visitor location register and/or serving GPRS support node (VLR/SGSN) number—which cannot be statically provisioned. As a result, the home subscriber server (HSS) of this type needs to be able to retrieve a subscriber's dynamic location/state data from a home location register (HLR) to fulfill any queries from, for example, an Internet media subsystem (IMS) application server (AS).

However, because the current standard presumes that the home location register (HLR) functions will be integrated into home subscriber server (HSS), there is no standard interface defined between a home location register (HLR) and a home subscriber server (HSS). Therefore, there is an inconsistency between a desired implementation of the standards and that which is contemplated by the standards.

The present invention contemplates a new and improved system that resolves the above-referenced difficulties and others.

SUMMARY OF THE INVENTION

A method and apparatus for facilitating interaction between a home subscriber server (HSS) and a home location register (HLR) in a legacy network are provided.

In one aspect of the invention, a method comprises receiving a message at the home subscriber server (HSS), determining whether the message is requesting location or state information of a mobile station of the subscriber, determining an address for the home location register (HLR) of the mobile station, transmitting a request for the location or state information to the home location register (HLR) based on the address and receiving a response from the home location register (HLR), the response including the location or state information.

In another aspect of the invention, the method further comprises sending the message by an application server (AS) to the home subscriber server (HSS).

In another aspect of the invention, determining the address for the home location register (HLR) comprises accessing a database.

In another aspect of the invention, transmitting comprises transmitting a mobile application part (MAP) request message.

In another aspect of the invention, transmitting comprises transmitting a mobile application part (MAP) AnyTimeInterrogation (ATI) request message.

In another aspect of the invention, receiving comprises receiving the location or state information in a mobile application part (MAP) response message.

In another aspect of the invention, receiving comprises receiving the location or state information in a mobile application part (MAP) AnyTimeInterrogation (ATI) response message.

In another aspect of the invention, the method further comprises sending a second request by the home location register (HLR) to a visiting location register or serving GPRS support node (VLR/SGSN) and receiving a second response by the home location register (HLR) from the visiting location register/serving GPRS support node.

In another aspect of the invention, sending of the second request comprises sending a mobile application part (MAP) request message.

In another aspect of the invention, sending of the second request comprises sending a mobile application part (MAP) ProvideSubscriberInfo (PSI) request message.

In another aspect of the invention, receiving the second response comprises receiving a mobile application part (MAP) response message.

In another aspect of the invention, receiving the second response comprises receiving a mobile application part (MAP) ProvideSubscriberInfo (PSI) response message.

In another aspect of the invention, means are provided to implement the methods of the present invention.

In another aspect of the invention, a system comprises a database having stored therein information correlating subscribers to home location register (HLR) address and a module operative to determine whether a request for a location or state of a mobile station of a subscriber is received, determine an address for a home location register (HLR) of the mobile station, transmit a request for the location or state information to the home location register (HLR) based on the address, and receive a response from the home location register (HLR), the response including the location or state information.

In another aspect of the invention, the request comprises a mobile application part (MAP) request message.

In another aspect of the invention, the request comprises a mobile application part (MAP) AnyTimeInterrogation (ATI) request message.

In another aspect of the invention, the response comprises a mobile application part (MAP) response message.

In another aspect of the invention, the response comprises a mobile application part (MAP) AnyTimeInterrogation (ATI) response message.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 3:
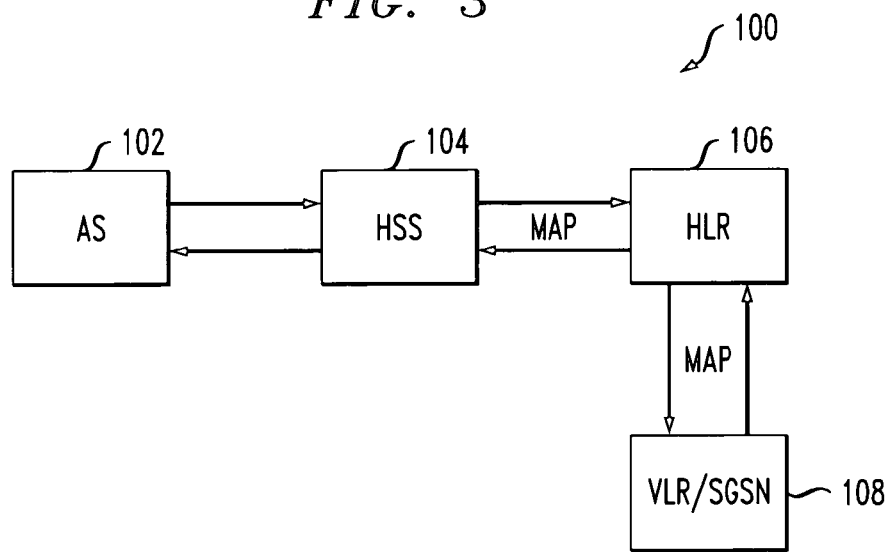
FIG. 3 illustrates a network into which the present invention may be implemented.

Referring now to the drawings wherein the showings are for purposes of illustrating the preferred embodiments of the invention only and not for purposes of limiting same, FIG. 3 provides a view of a system, e.g., a portion of an Internet (or IP) multimedia subsystem (IMS), into which the present invention may be implemented. As shown, a portion of a network 100 includes an application server (AS) 102, and a home subscriber server (HSS) 104. The network 100 also includes portions of a legacy system such as home location register (HLR) 106 and a Visitor location register or a serving GPRS (General Packet Radio Service) support node (VLR/SGSN) 108.

It should be appreciated that the network 100 is illustrated as an example for ease of explanation. As noted, it may well only represent a portion of a network into which the presently described embodiments may be implemented. For example, additional application servers (ASs) and home location registers (HLRs) may be included within the network to communicate with the home subscriber server (HSS) shown. Additional home subscriber servers (HSSs), as well as other network elements, may also be provided.

The application server 102 is preferably an internet multimedia subsystem (IMS) application server (AS) that functions in a manner that will be understood by those skilled in the art. In accord with the embodiments described herein, the application server (AS) 102 typically transmits requests for location or state information in the form of Diameter Sh (UDR) protocol request messages. It also is operative to receive Diameter Sh (UDA) protocol response messages. However, it should be appreciated the other messaging techniques and protocols may also be used.

Likewise, the home location register (HLR) 106 and the visitor location register or serving GPRS support node (VLR/SGSN) 108 take forms that are well known. It should be understood that the home location register (HLR) 106 and the visitor location register or serving GPRS support node (VLR/SGSN) 108 preferably support standard mobile application part (MAP) protocol messaging. Again, however, other messaging techniques or protocols may also be used.

Figure 4:
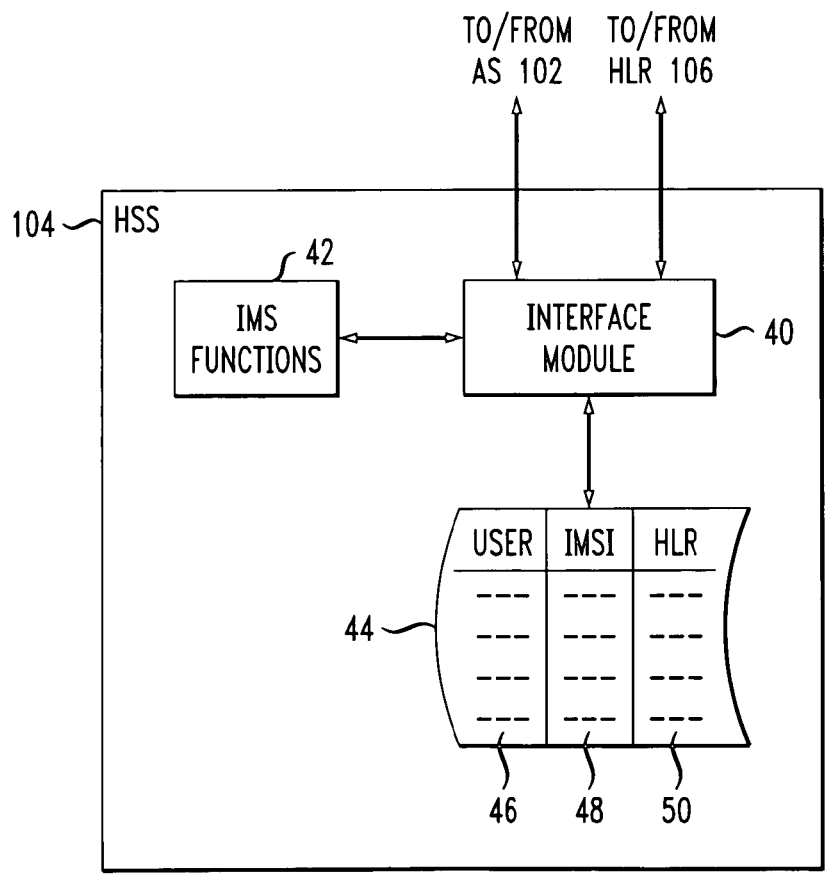
FIG. 4 illustrates a home subscriber server (HSS) according to the present invention.

The home subscriber server (HSS) 104, in at least one embodiment, takes the form as shown in FIG. 4. As illustrated, the home subscriber server (HSS) 104 includes a module or interface, such as an interface module 40, that is operative to provide an interface to other network elements, and to elements within the home subscriber server (HSS) 104. It should be understood that the interface module 40 may be embodied in a number of different forms (and may even be distributed through multiple modules or interfaces) for communicating data to and from, for example, the application server (AS) 102 and the home location register (HLR) 106. The interface module 40 also communicates with the modules of the home subscriber server (HSS) 104 that provide internet multimedia subsystem (IMS) functionality. This internet multimedia subsystem functionality is illustrated as a single module 42; however, it is understood that this functionality of the home subscriber server (HSS) 104 may take a variety of forms that will be apparent to those skilled in the art. Along these same lines, it will also be understood that the home subscriber server (HSS) 104 may well include other components that are not shown for ease of explanation. However, those skilled in the art will understand that such other functionality is included within the element 104.

The interface module 40 also communicates with a database 44 within the home subscriber server (HSS) 104. As shown, the database 44 includes a user data field 46 wherein private user identifications are stored. The database 44 also includes data fields 48 and 50 relating to an International mobile subscriber identity (IMSI) and to a home location register (HLR) address for each private user ID. It should be appreciated that the database 44 may also be provided within another network element or as a separate network element. In addition, database 44 may also include other data fields, whose description is omitted here for ease of explanation.

The database 44 is built and maintained based on the fact that each Internet media subsystem (IMS) user possesses a Private User identification (e.g. Private User ID). Each Private User ID can have a one-to-one correspondence with a UMTS/GSM International mobile subscriber identity (IMSI). The home subscriber server (HSS) according to the present invention stores (in, for example, database 44) an International mobile subscriber identity (IMSI) for a Private User ID if the Private User ID has a one-to-one correspondence with a UMTS/GSM International mobile subscriber identity (IMSI). The home subscriber server (HSS) 104 likewise stores (in, for example, database 44) a home location register (HLR) address for each International mobile subscriber identity (IMSI).

As noted above, the home subscriber server (HSS) 104 functions to support the internet multimedia subsystem (IMS) functions and the objectives of the present invention as set forth herein. It should be understood that the home subscriber server (HSS) will preferably support standard mobile application part (MAP) protocols, or other protocols that may be used.

It should further be understood that the actual implementation of the home subscriber server (HSS) 104 may be accomplished by providing the home subscriber server (HSS) to a service provider without the contemplated legacy home location register (HLR) functions. Alternatively, such functionality may simply be blocked or turned off in a standard home subscriber server (HSS). In either case, the functionality described in connection with this invention (e.g., FIGS. 5 and 6) is preferably performed within the home subscriber server (HSS) to accomplish the objectives of the invention.

In this regard, embodiments as described in connection with FIGS. 3 and 4 provide a solution for a home subscriber server (HSS) to retrieve a subscriber's dynamic location/state data from a legacy home location register (HLR) via existing standard mobile application part (MAP) operations, e.g. AnyTimeInterrogation (ATI) messages. According to these embodiments, a home subscriber server (HSS) can retrieve a subscriber's dynamic location/state data from a legacy home location register (HLR) when an Internet media subsystem (IMS) application server (AS) queries the home subscriber server (HSS) for such information. After the home subscriber server (HSS) retrieves subscriber's location/state data, the home subscriber server (HSS) will pass the data to the Internet media subsystem (IMS) application server (AS) to fulfill the query from Internet media subsystem (IMS) application server (AS).

Figure 1:
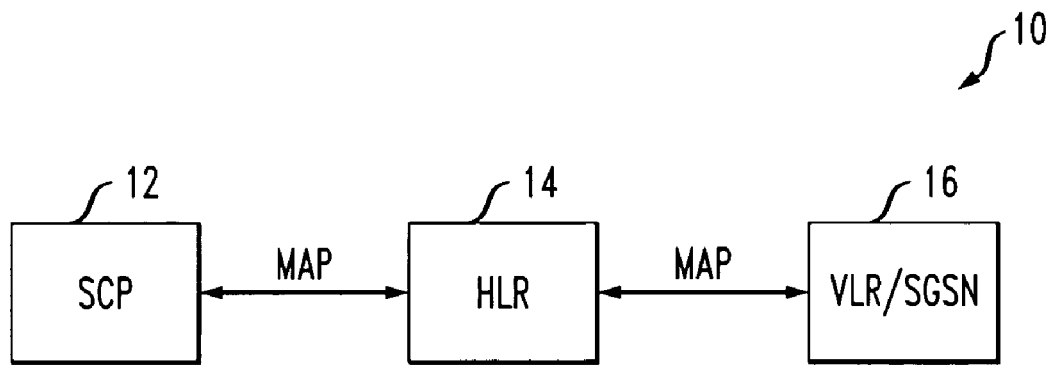
FIG. 1 illustrates a portion of a legacy network.
Figure 2:
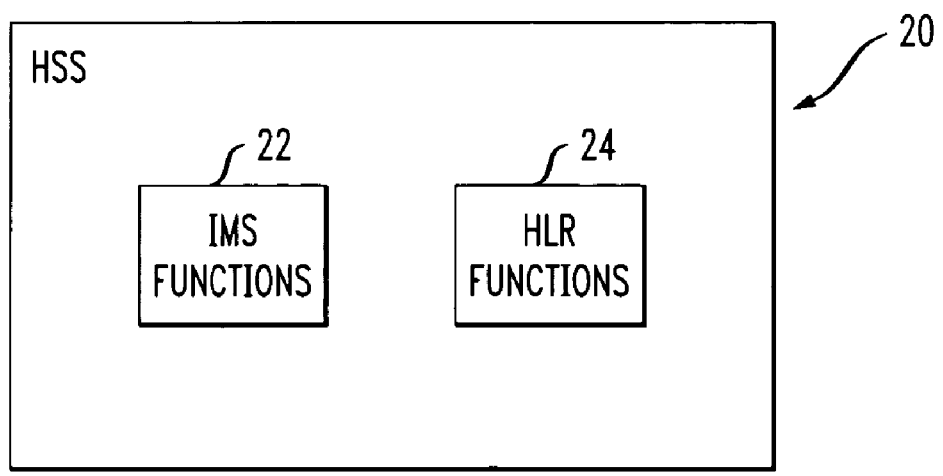
FIG. 2 illustrates a schematic drawing of a home subscriber server (HSS) as contemplated by a standard.

As noted, the invention is preferably implemented through modifications to the home subscriber server (HSS) 104. The modifications may be implemented in a variety of manners using a variety of software techniques and hardware configurations. In one form, a software routine is implemented within the interface module 40 to function in a manner that will determine when location or state information is requested and endeavor to obtain that information from the legacy network. In doing so, the home subscriber server (HSS) 104 will be acting, from the perspective of the home location register (HLR) 106, as a service control point (SCP) (e.g., the service control point (SCP) 12 in FIG. 1).

Figure 5:
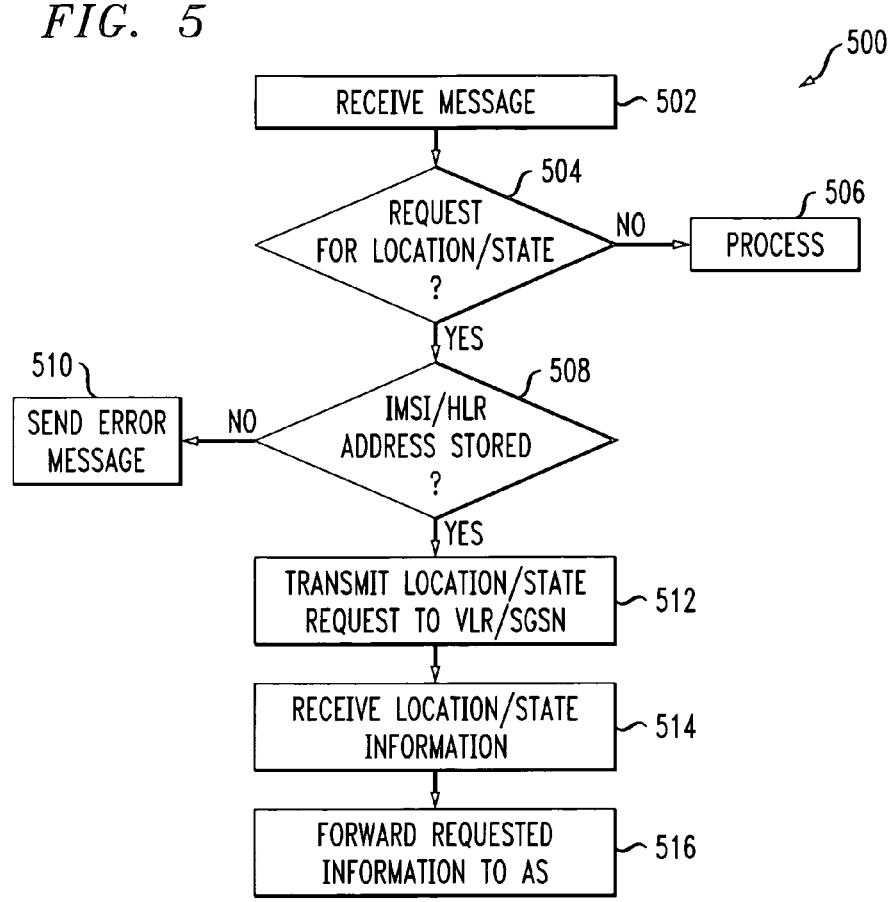
FIG. 5 illustrates a flow chart illustrating a method according to the present invention; and, FIG. 6 illustrates a call flow diagram illustrating a method according to the present invention.

In this regard, referring now to FIG. 5, a method 500 according to the present invention is illustrated. As shown, the method 500 is initiated upon receipt of a message by the home subscriber server (HSS) 104 (e.g., by the interface module 40) from the application server 102 (at 502). A determination is then made by the interface module 40 as to whether the message includes a request for location or state information (at 504). If not, the message is processed as is normal (at 506). If, however, the received message includes a request for location or state data or information, a determination is made as to whether the International mobile subscriber identity (IMSI) and/or the home location register (HLR) address is stored in the database 44 for the requested user (at 508). If not, an error message is simply sent back to the application server (AS) (at 510). If, however, a corresponding home location register (HLR) address and International mobile subscriber identity (IMSI) are stored for the user, a location and/or state request is sent to the appropriate home location register (HLR) having the stored address (at 512). The home subscriber server (HSS) then simply waits to receive the location and/or state information (at 514) and forwards it to the application server (AS) (at 516).

Figure 6:
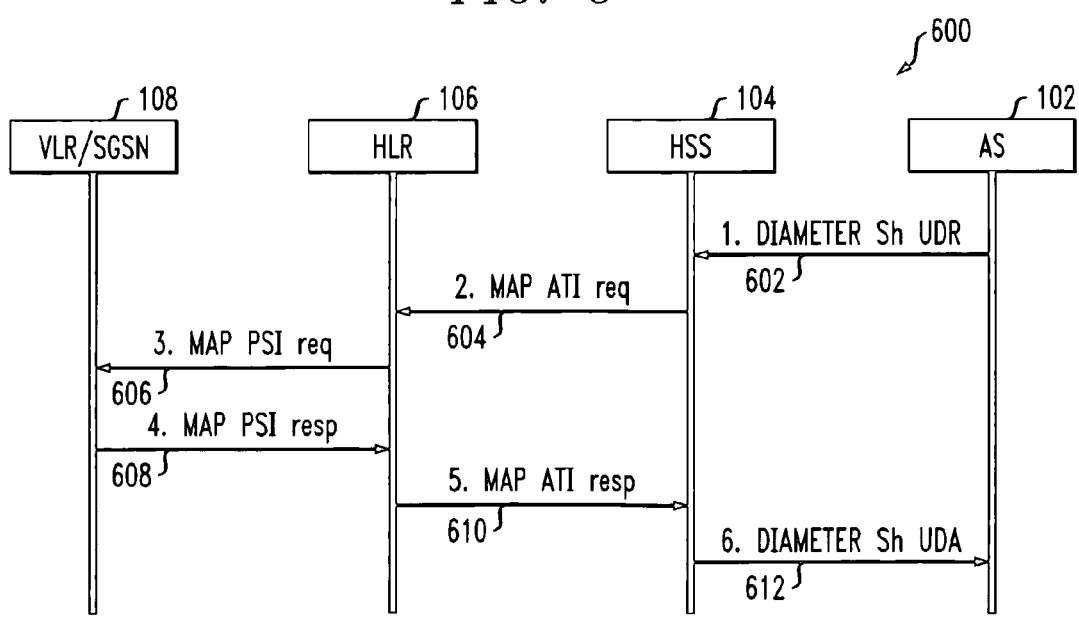

The method described in connection with FIG. 5 illustrates the function of the invention from the perspective of the home subscriber server (HSS). Referring now to FIG. 6, a call flow 600 is illustrated. This call flow also provides a description of other network elements that are in communication with the home subscriber server (HSS) during implementation of the present invention.

As shown in FIG. 6, initially, the home subscriber server (HSS) 104 receives a message, e.g. a Diameter SH message such as a User-Data-Request (UDR) message, from an Internet media subsystem (IMS) application server (AS) 102. This message requests the circuit domain location/state data or packet domain location/state data for a user or subscriber of a network, such as an Internet media subsystem (IMS) (at 602). Such a message may be generated for a variety of reasons.

The home subscriber server (HSS) 104 determines that such a request includes a request for location or state information of a particular mobile station. The home subscriber server (HSS) 104 then accesses the subscriber database 44 to identify the International mobile subscriber identity (IMSI) and home location register (HLR) address for the Internet media subsystem (IMS) user. Once the information is retrieved from the database, the home subscriber server (HSS) 104 sends a request, e.g. a mobile application part (MAP) AnyTimeInterrogation (ATI) operation request, to the appropriate home location register (HLR) 106 having the identified address to obtain the requested information (at 604).

The home location register (HLR) 106 locates the International mobile subscriber identity's (IMSI's) dynamically stored visitor location register (VLR) or SGSN number for the subscriber using well known techniques. It should be appreciated that the home location register (HLR) 106 does not distinguish the source of the request. This type of request, as noted above, typically originates at a service control point (SCP), such as the service control point (SCP) 12 of FIG. 1. However, the home subscriber server according to the present application utilizes standard messaging techniques that are normally attributed to other network elements such as service control points (SCPs). There is no need for the home location register (HLR) 106 to distinguish between sources of the messages, so long as the home location register (HLR) recognizes the message request and is able to respond to the source. If the home location register (HLR) 106 can determine whether the request message originated from an authorized source, however, the home location register (HLR) 106 can add the home subscriber server (HSS) 104 to an authorized source list.

The home location register (HLR) 106, as it does in its normal operation, sends a request, e.g. a mobile application part (MAP) ProvideSubscriberInfo (PSI) request, to the appropriate visitor location register (VLR) or SGSN 108, as requested by the home subscriber server (HSS) 104 (at 606). The visitor location register and/or serving GPRS support node (VLR/SGSN) 108 returns the location/state information of the subscriber to the home location register (HLR) 106 within a mobile application part (MAP) PSI response, per normal operation techniques (at 608).

The home location register (HLR) 106 sends to the home subscriber server (HSS) 104 a mobile application part (MAP) AnyTimeInterrogation (ATI) response that includes the subscriber's location/state information (at 610).

The home subscriber server (HSS) 104, in turn, responds to the Internet media subsystem (IMS) application server (AS) 102 with a Diameter Sh message User-Data-Answer (UDA) including the user's location/state information (at 612).

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for facilitating interaction between a home subscriber server (HSS), and at least one home location register (HLR) in a legacy network, the method comprising:
    receiving a message at the home subscriber server (HSS) from an application server, the home subscriber server (HSS) being inoperative to perform as a home location register;
    determining whether the message is requesting location or state information of a mobile station of a subscriber;
    determining an address for a home location register (HLR) of the mobile station;
    transmitting a request for the location or state information to the home location register (HLR) based on the address; and,
    receiving a response from the home location register (HLR), the response including the location or state information.

2. The method as set forth in claim 1 wherein the message comprises a Diameter Sh protocol message.

3. The method as set forth in claim 1 wherein determining the address for the home location register (HLR) comprises accessing a database.

4. The method as set forth in claim 1 wherein the transmitting comprises transmitting a mobile application part (MAP) request message.

5. The method as set forth in claim 1 wherein the transmitting comprises transmitting a mobile application part (MAP) AnyTimeInterrogation (ATI) request message.

6. The method as set forth in claim 1 wherein the receiving of the response comprises receiving the location or state information in a mobile application part (MAP) response message.

7. The method as set forth in claim 1 wherein the receiving of the response comprises receiving the location or state information in a mobile application part (MAP) AnyTimeInterrogation (ATI) response message.

8. The method as set forth in claim 1 further comprising:
    sending a second request by the home location register (HLR) to a visiting location register or serving GPRS support node (VLR/SGS N); and,
    receiving a second response by the home location register (HLR) from the visiting location register/serving GPRS support node.

9. The method as set forth in claim 8 wherein the sending of the second request comprises sending a mobile application part (MAP) request message.

10. The method as set forth in claim 8 wherein the sending of the second request comprises sending a mobile application part (MAP) ProvideSubscriberInfo (PSI) request message.

11. The method as set forth in claim 8 wherein the receiving the second response comprises receiving a mobile application part (MAP) response message.

12. The method as set forth in claim 8 wherein the receiving the second response comprises receiving a mobile application part (MAP) ProvideSubscriberInfo (PSI) response message.

13. The method as set forth in claim 1 further comprising responding to the application server with a Diameter Sh protocol message based on the response.

14. A system for implementing a home subscriber server (HSS) in a legacy network including a home location register (HLR) associated with a subscriber, the system comprising:
    means for receiving a message at the home subscriber server (HSS) from an application server, the home subscriber server (HSS) being inoperative to perform as a home location register;
    means for determining whether the message is a request for location or state information of a mobile station of the subscriber;
    means for determining an address for the home location register (HLR) of the mobile station;
    means for transmitting a request for the location or state information to the home location register (HLR) based on the address; and,
    means for receiving a response from the home location register (HLR), the response including the location or state information.

15. The system as set forth in claim 14 further comprising means for sending the message to the home subscriber server (HSS).

16. The system as set forth in claim 14 wherein the means for determining the address for the home location register (HLR) comprises means for accessing a database.

17. The system as set forth in claim 14 wherein the means for the transmitting comprises means for transmitting a mobile application part (MAP) AnyTimeInterrogation (ATI) request message.

18. The system as set forth in claim 14 wherein the means for the receiving comprises means for receiving the location or state information in a mobile application part (MAP) AnyTimeInterrogation (ATI) response message.

19. The system as set forth in claim 14 further comprising:
    means for sending a second request to a visiting location register or serving GPRS support node (VLR/SGSN); and,
    means for receiving a second response from the visiting location register/serving GPRS support node.

20. The system as set forth in claim 19 wherein the means for the sending of the second request comprises means for sending a mobile application part (MAP) ProvideSubscriberInfo (PSI) request message.

21. The system as set forth in claim 19 wherein the means for the receiving the second response comprises means for receiving a mobile application part (MAP) ProvideSubscriberInfo (PSI) response message.

22. A home subscriber server (HSS) comprising:
a database having stored therein information correlating subscribers to home location register (HLR) address; and,
a module operative to determine whether a request from an application server for a location or state of a mobile station of a subscriber is received, determine an address for a home location register (HLR) of the mobile station, transmit a request for the location or state information to the home location register (HLR) based on the address, and receive a response from the home location register (HLR), the response including the location or state information, the home subscriber server (HSS) being inoperative to perform as a home location register.

23. The server as set forth in claim 22 wherein the request from the application server comprises a Diameter Sh protocol request message.

24. The server as set forth in claim 22 wherein the request to the HLR comprises a mobile application part (MAP) AnyTimeInterrogation (ATI) request message.

25. The server as set forth in claim 22 wherein the module is further operative to respond to the application server with a Diameter Sh protocol message based on the response.

26. The server as set forth in claim 22 wherein the response from the HLR comprises a mobile application part (MAP) AnyTimeInterrogation (ATI) response message.

* * * * *

UNITED STATES PATENT AND TRADEMARK OFFICE
CERTIFICATE OF CORRECTION

PATENT NO.       : 7,583,646 B2  Page 1 of 1
APPLICATION NO. : 10/965387
DATED            : September 1, 2009
INVENTOR(S)      : Hua et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 465 days.

Signed and Sealed this

Fourteenth Day of September, 2010

David J. Kappos
*Director of the United States Patent and Trademark Office*